United States Patent [19]
Takahashi et al.

[11] Patent Number: 5,850,900
[45] Date of Patent: Dec. 22, 1998

[54] SYNCHRONIZER RING HAVING WOOD CERAMICS LAYER OF FRICTION MEMBER

[75] Inventors: Jin Takahashi, Hokkaido; Kazuo Hokkirigawa, Yamagata ken; Toshihiro Okabe; Koji Saito, both of Aomori ken, all of Japan

[73] Assignee: Functional Wood Material Research Association, Tokyo, Japan

[21] Appl. No.: 754,975

[22] Filed: Nov. 19, 1996

[30] Foreign Application Priority Data

Nov. 20, 1995 [JP] Japan ..................................... 7-323559

[51] Int. Cl.$^6$ ..................................... F16D 69/02
[52] U.S. Cl. ..................................... 192/107 M; 192/53.34
[58] Field of Search ........................... 192/107 M, 53.34, 192/66.2; 106/36

[56] References Cited

U.S. PATENT DOCUMENTS

| | | | |
|---|---|---|---|
| 4,267,912 | 5/1981 | Bauer et al. | 192/107 M X |
| 4,762,216 | 8/1988 | Pusatcioglu et al. | 192/107 M |
| 5,433,774 | 7/1995 | Kapl et al. | 106/36 |

FOREIGN PATENT DOCUMENTS

| | | | |
|---|---|---|---|
| 62-17435 | 1/1987 | Japan | 106/36 |
| 1-220731 | 9/1989 | Japan | 106/36 |
| 2552577 | 8/1996 | Japan . | |
| 2109806 | 6/1983 | United Kingdom | 192/107 M |

*Primary Examiner*—Richard M. Lorence
*Attorney, Agent, or Firm*—Eckert Seamans Cherin & Mellott, LLC

[57] ABSTRACT

To provide a synchronizer ring having both the characteristic of quickly synchronizing two gears and the characteristic of no burning, a wood ceramics layer of a friction member 12 is formed on a tapered inner circumferential surface of a ring-like structure 11 of a synchronizer ring 10. Since the friction member 12 of the synchronizer ring 10 according to the present invention is formed of wood ceramics, the synchronizer ring 10 can attain porosity, wear resistance, heat resistance, and seizure resistance. Owing to the porosity of the wood ceramics, the formation of an oil film at a friction interface can be suppressed to thereby enlarge the coefficient of dynamic friction. Accordingly, two gears can be quickly synchronized with no seizure owing to the heat resistance and the seizure resistance.

7 Claims, 6 Drawing Sheets

SYNCHRONIZER RING HAVING WOOD CERAMICS LAYER OF FRICTION MEMBER

FIELD OF THE INVENTION

The present invention relates to a synchronizer ring incorporated in a transmission, for synchronizing two gears to be smoothly brought into mesh with each other in gear changing of the transmission.

BACKGROUND OF INVENTION

Conventionally, a synchronizer ring has a ring-like structure, which is mounted rotatably and movably in a thrust direction between two gears to be brought into mesh with each other through a ring-like sleeve in gear changing of a transmission connected to a clutch. The sleeve has internal teeth on its inner circumferential surface, and is kept always meshing with one of the two gears. When the sleeve is moved in the thrust direction by an external operation, the sleeve comes to mesh with the other gear, thereby transmitting torque between the two gears.

The synchronizer ring functions to brake the other gear idling by inertia when the clutch has been fully disengaged to cut off the power from an engine, and to smoothly bring the sleeve into mesh with the other gear so that the other gear rotates with the one gear at the same rotating speed (synchronous rotation), thereby smoothly performing the gear changing operation of the transmission.

The synchronizer ring performs the following series of operation to rotate the other gear synchronously with the one gear and smoothly bring the sleeve into mesh with the other gear.

First, the synchronizer ring is pressed to be moved by the sleeve moved in the thrust direction by an external operation upon gear changing of the transmission, and comes close to the other gear idling by inertia.

The synchronizer ring has a tapered inner circumferential surface provided with a layer of a friction member. The layer of the friction member is pressed on the outer circumferential surface of an opposite member integrated with the other gear, thus coming into frictional engagement with the opposite member to thereby brake the opposite member. The opposite member is thus braked to gradually reduce the rotating speed of the other gear until the other gear comes to synchronous rotation with the one gear.

When a relative velocity of both the gears becomes nearly zero, the sleeve is further moved in the thrust direction by the external operation to pass the synchronizer ring and come to mesh with the other gear, thus finally transmitting torque between the two gears.

The friction member of the synchronizer ring is usually formed of copper alloy such as MBA-2 and MBA-5. In this case, the layer of the friction member is integrated with the ring-like structure. In a few cases, a paper material is also used. In some case, molybdenum is fixed to the inner circumferential surface of the synchronizer ring by thermal spray.

Meanwhile, the following characteristics are required for a synchronizer ring.

(1) The coefficient of dynamic friction to the opposite member must be large, because the synchronizer ring must be brought into frictional engagement with the opposite member to synchronize the two gears.

(2) The coefficient of friction at the relative velocity near zero must not be large, in order to reduce a shock upon meshing of the sleeve and the other gear.

(3) The synchronizer ring must not be burnt by frictional heat generated upon braking the opposite member. In particular, the synchronizer ring must not be burnt by such braking frictional heat generated in mis-operation of a clutch shift lever.

The mis-operation of the clutch shift lever means an operation of the clutch shift lever in such a condition that a clutch pedal is not properly depressed. In this mis-operation, engine torque remains transmitted to the other gear, so that the other gear is rotated by a torque larger than that at idling after full disengagement of the clutch. Accordingly, a large heat load (tens of times a usual value) is generated in the synchronizer ring. As a result, the friction member becomes high in temperature because of braking frictional heat, causing a possibility of carbonization and abnormal wearing of the friction member, which in turn impairs the synchronizing function of the synchronizer ring.

The characteristic (3) of the above three characteristics tends to have priority, so that copper alloy is frequently used. However, since copper alloy has a coefficient of dynamic friction smaller than that of any of the other materials, copper alloy is inferior in the characteristics (1) and (2).

The characteristic (1) is intended to be improved by forming a friction surface of copper alloy into multiple layers, e.g., two or three layers, to increase a capacity for absorbing the braking frictional heat, thereby increasing the coefficient of dynamic friction.

However, such multiple layers of the friction surface invites another problem such that the mechanism of the transmission becomes complicated, large in size, and high in cost.

On the other hand, a paper material as another friction material has the characteristics (1) and (2); however, this material has a problem such that there is a possibility of burning due to the braking frictional heat generated upon mis-operation of the clutch shift lever.

Further, molybdenum as another friction material is more durable to the braking frictional heat upon mis-operation of the clutch shift lever than copper alloy; however, this material is inferior in the characteristics (1) and (2).

It is accordingly desired to provide a synchronizer ring having both the characteristic of quickly synchronizing the two gears and the characteristic of no burning.

It is further necessary that the friction member is formed with a number of pores to provide good frictional characteristics of the synchronizer ring. The presence of numerous pores in the friction member offers an advantage such that when the synchronizer ring comes to contact with the opposite member, an oil film is hardly formed on the friction surface to thereby increase the coefficient of dynamic friction.

Further, the friction member must have heat resistance, wear resistance, and seizure resistance in order to prevent burning.

As mentioned above, the heat load applied to the synchronizer ring upon mis-operation of the clutch shift lever is greatly large. Accordingly, if a paper friction material mainly composed of organic materials is used, it is almost impossible to prevent burning of the friction member. To prevent burning of the friction member, a metal material is used as the friction member; however, the metal material has no numerous pores.

Thus, the most desirable material for the friction member of the synchronizer ring is a material having porosity, heat resistance, wear resistance, and seizure resistance.

SUMMARY OF THE INVENTION

According to the present invention intended to solve the above problems, there is provided a synchronizer ring comprising a ring-like structure having a tapered inner circumferential surface and a layer of a friction member formed on the tapered inner circumferential surface of the ring-like structure, wherein the friction member is formed of wood ceramics.

Preferably, (1) the layer of the friction member comprises a ring-like layer, (2) the layer of the friction member comprises a plurality of chips, (3) the layer of the friction member comprises a layer formed by fixing a wood ceramics precursor to the ring-like structure and then carbonizing to bake the wood ceramics precursor, or (4) the layer of the friction member comprises a layer formed by baking a wood ceramics-containing film on the structure to thereby integrate the film with the structure.

The wood ceramics is a carbonized composite material obtained by impregnating a wood material, such as, wood, paper, chip and the like with a phenol resin to cure the phenol resin, and then carbonizing to bake the wood material as shown, for example in Japanese Patent Laying-open Gazette No. 164800/1992.

The wood ceramics has the following characteristics.

(1) Numerous pores owing to the wood material are present.

(2) The heat resistance is excellent because this material is a carbon material.

(3) The cost and weight can be reduced because the wood material is used as a raw material and a manufacturing process is simple.

The friction member of the synchronizer ring according to the present invention is formed of wood ceramics. Accordingly, the porosity, wear resistance, heat resistance, and seizure resistance can be ensured, and the weight can also be reduced.

When the friction member of the synchronizer ring according to the present invention is pressed on an opposite member, an oil film is hardly formed at a friction interface because of the porosity of the friction member. Therefore, the friction member according to the present invention has a large coefficient of dynamic friction.

EMBODIMENTS

Some preferred embodiments of the present invention will now be described with reference to FIGS. 1 to 6.

Figure 1:
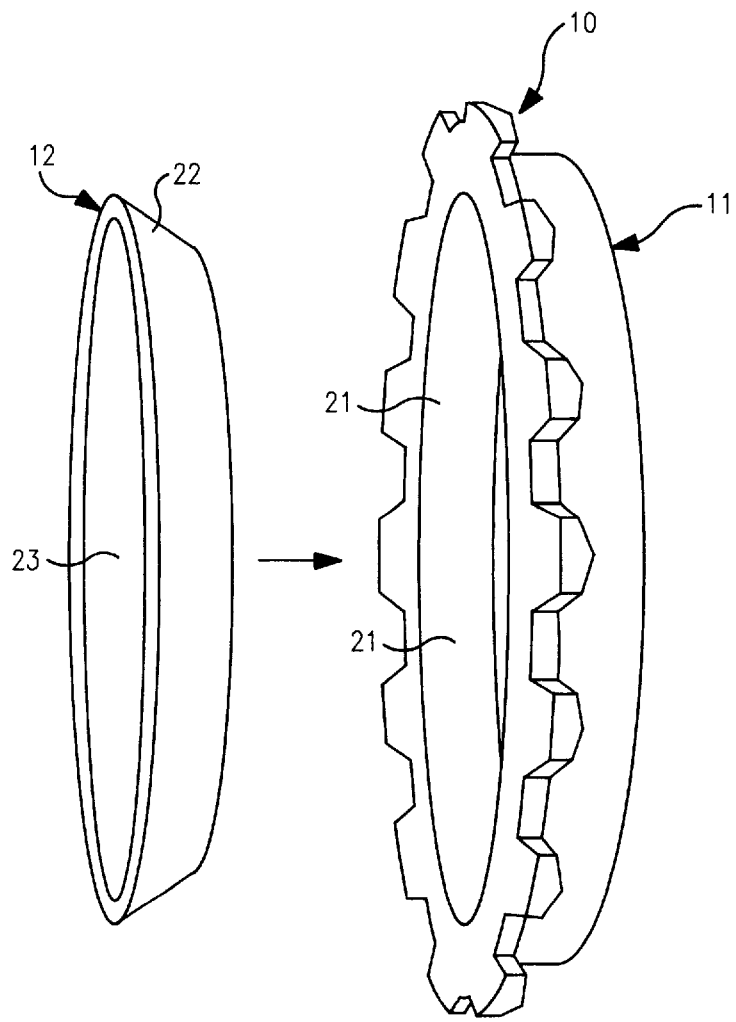
FIG. 1 is an exploded perspective view of a synchronizer ring consisting of a structure and a ring-like friction member according to one embodiment of the present invention.

A synchronizer ring 10 shown in FIG. 1 is composed of a ring-like structure 11 having a tapered (conical) inner circumferential surface 21, and a ring-like friction member 12 formed of wood ceramics and having a tapered (conical) outer circumferential surface 22 whose tapering degree is the same as that of the tapered inner circumferential surface 21 of the ring-like structure 11.

Wood ceramics are carbonized composite materials obtained by impregnating woods or wooden source materials such as fiber boards and particle boards with a phenolic resin, and sintering the impregnated wood materials in a controlled atmosphere to carbonize them.

In one example of wood ceramic production, beech boards (45×30×20 mm) and medium fiber boards (41×41×9 mm) were soaked in a phenol resin solution. The resin was injected under a reduced pressure for 3 hours by a vacuum pump. The impregnated materials were then placed in an electric furnace in an air-interrupted state, where they were subjected to a three-stage sintering program. During the first stage of sintering the materials were heated at a rate of 1° C./min. to a temperature of 100° C. The materials were then maintained at this temperature for a period of nine (9) hours. Thereafter, the temperature of the material was increased at the rate of 1° C./min. from 100° C. to a temperature of 500° C. The material was maintained at 500° C. for a period of 1 hour 20 minutes. Finally, the material was heated at the rate of 1° C./min. to a temperature of 1100° C. to complete the carbonizing process.

The tapered outer circumferential surface 22 of the ring-like friction member 12 is engaged with and bonded to the tapered inner circumferential surface 21 of the ring-like structure 11. Thus, a layer of the friction member 12 is formed in the structure 11.

An inner circumferential surface 23 of the friction member 12 is ground and taperingly finished so as to come into close contact with a tapered outer circumferential surface of an opposite member, that is, a taper cone. The taper inner circumferential surface 23 of the friction member 12 serves as a friction surface.

The inner circumferential surface 23 is formed with grooves (not shown) for removing a lubricating oil.

Figure 2:
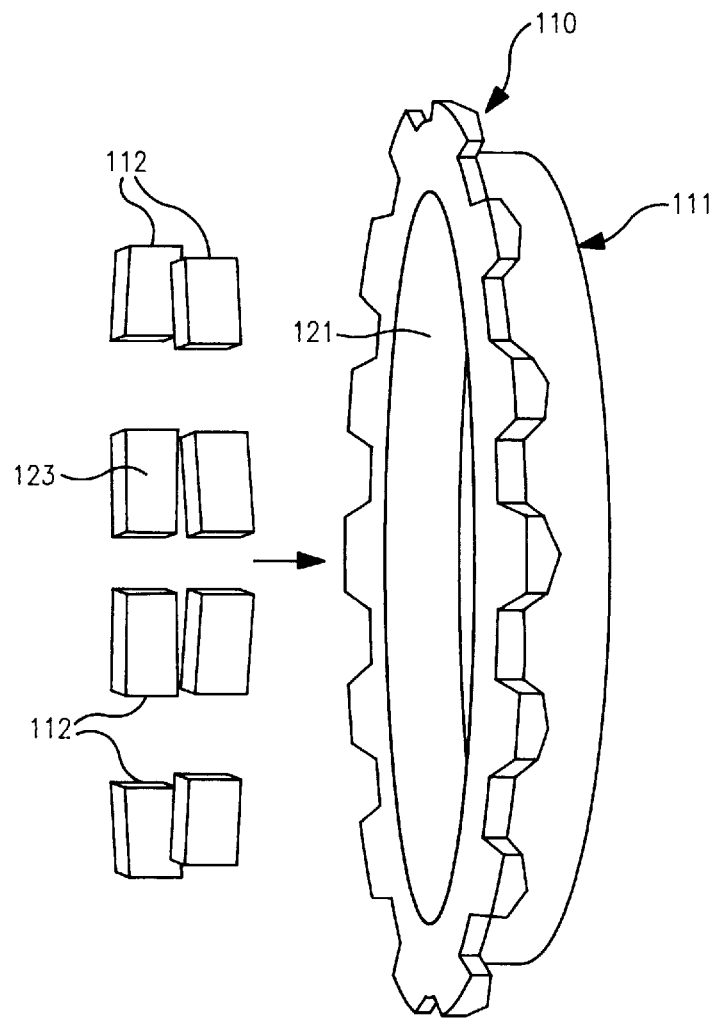
FIG. 2 is an exploded perspective view of a synchronizer ring consisting of a structure and chip-like friction members according to another embodiment of the present invention.

A synchronizer ring 110 shown in FIG. 2 is composed of a ring like structure 111 having a tapered inner circumferential surface 121, and a plurality of chip-like friction members 112 formed of wood ceramics. The chip-like friction members 112 are arranged like a ring and attached to the inner circumferential surface 121 of the structure 111. Thus, a layer of the friction member 112 is formed in the structure 111. An inner circumferential surface 123 of the friction member 112 attached to the inner circumferential surface 121 of the structure 111 is ground and taperingly finished to form a friction surface.

The inner circumferential surface 123 is formed with grooves (not shown) for removing a lubricating oil.

Figure 3:
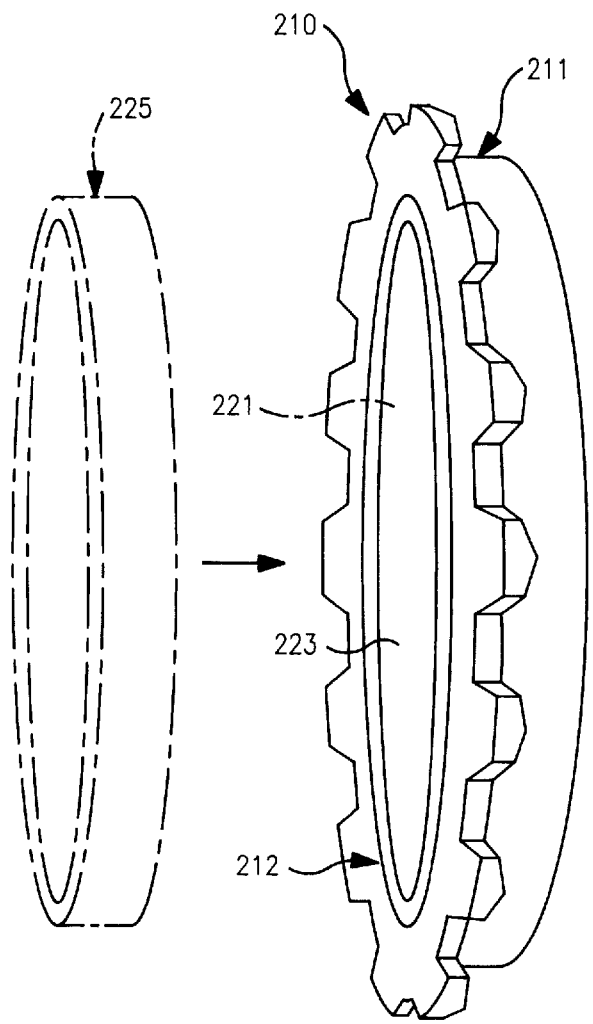
FIG. 3 is an exploded perspective view of a synchronizer ring consisting of a structure and a ring-like wood ceramics precursor to be baked after fixed to the structure according to another embodiment of the present invention.

A synchronizer ring 210 shown in FIG. 3 is composed of a ring-like structure 211 having an inner circumferential surface 221, and a wood ceramics layer 212 of a friction member integrated with the structure 211. The wood ceramics layer 212 is formed by attaching to the inner circumferential surface 221 of the structure 211 a ring-like wood ceramics precursor 225 impregnated with a phenol resin and then cured, and then carbonizing and baking the wood ceramics precursor 225. An inner circumferential surface 223 of the wood ceramics layer 212 is ground and taperingly finished to form a friction surface. The inner circumferential surface 223 is formed with grooves (not shown).

Figure 4:
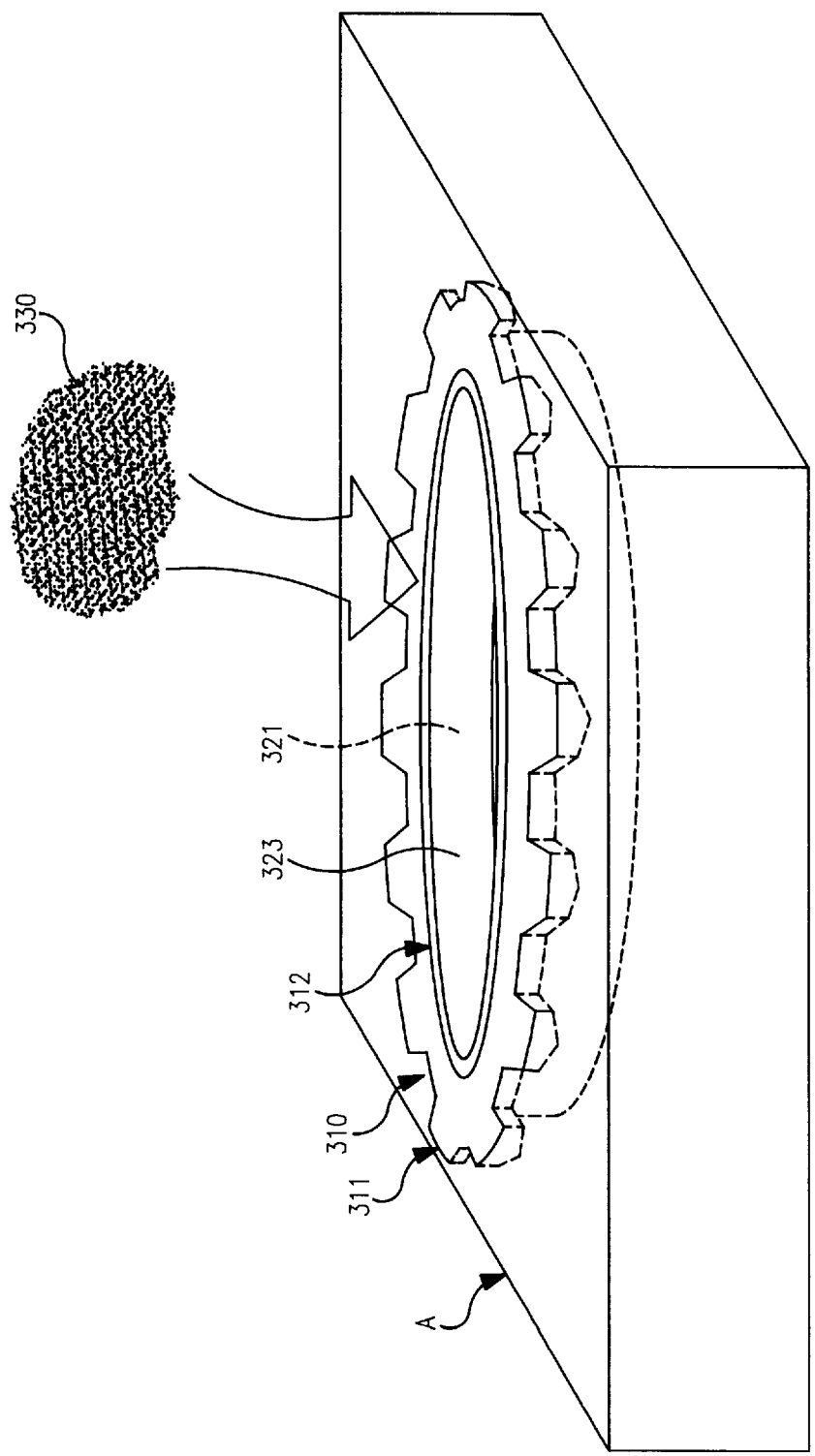
FIG. 4 is a perspective view showing a manufacturing method for a synchronizer ring according to another embodiment of the present invention, in which a wood ceramics layer is baked on the inner circumferential surface of a structure and integrated therewith.

A synchronizer ring 310 shown in FIG. 4 is composed of a ring-like structure 311 having a tapered inner circumferential surface 321, and a wood ceramics layer 312 of a friction member integrated with the structure 311. The wood ceramics layer 312 is formed by setting the structure 311 in a die A, applying with a uniform thickness to the inner circumferential surface 321 of the structure 311 a phenol resin (or rubber) 330 containing wood ceramics powdered with a uniform particle size, and heating the die A to thereby bake the film of the phenol resin 330 containing the wood ceramics on the inner circumferential surface 321 of the structure 311.

An inner circumferential surface 323 of the wood ceramics layer 312 is ground and taperingly finished to form a friction surface. The inner circumferential surface 323 is formed with grooves (not shown).

The characteristics of the synchronizer ring according to the present invention will now be described on the basis of test data.

Figure 5:
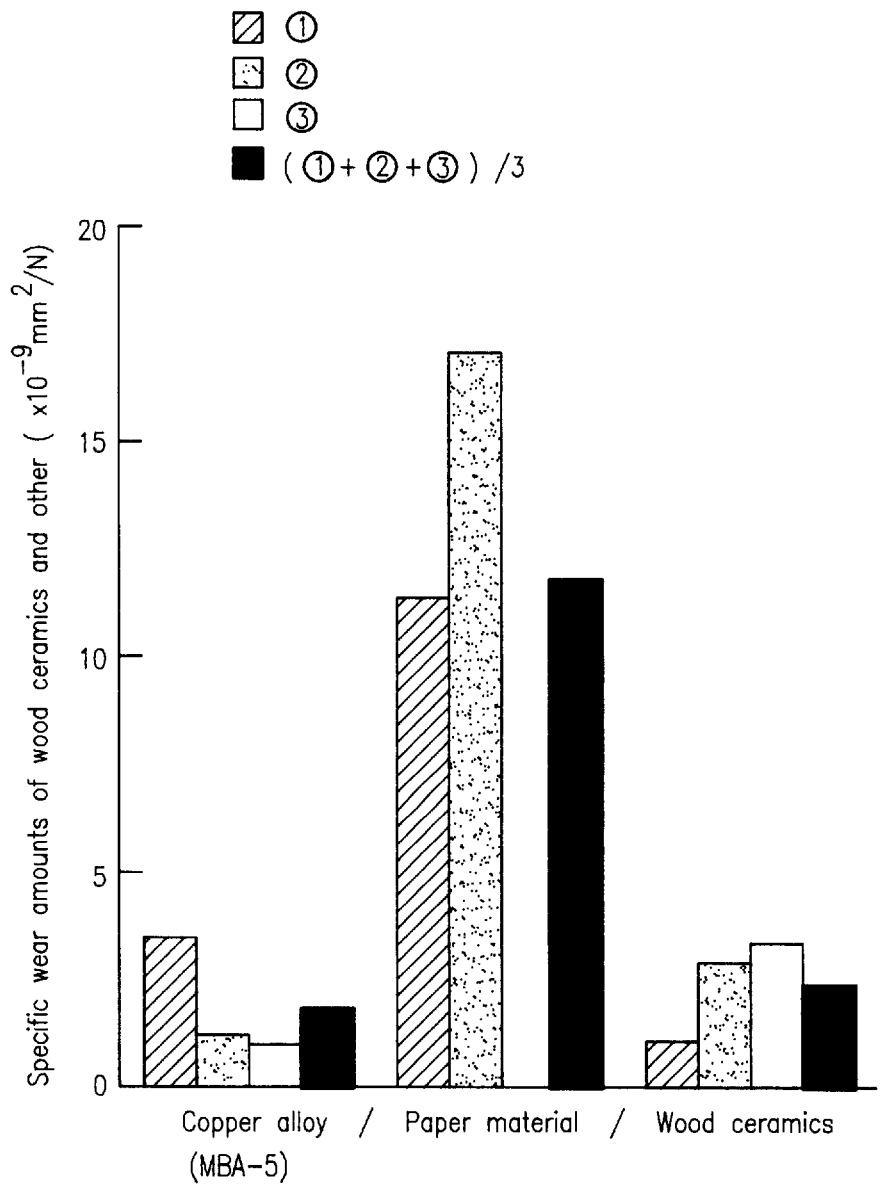
FIG. 5 is a graph showing a comparison in wear amount between wood ceramics and other materials.

FIG. 5 is a graph showing a comparison in wear amount between wood ceramics and other materials in a test such that each sample of copper alloy, a paper material, and wood ceramics as friction materials was pressed on a disk (not shown) under a surface pressure of 3.04 to 3.17 MPa, the disk was then rotated at a relative moving speed of 7.36 to 7.40 m/sec of each sample relative to the disk, and a wear amount was measured at a relative moving distance of 494 to 918 m of each sample relative to the disk.

The unit ($mm^2/N$) of the vertical axis of the graph shown in FIG. 5 is defined as a unit obtained by dividing a wear volume ($mm^2$) by a load (N) and a frictional moving distance (m or mm). This unit is used to compare wear resistances of the above materials.

As apparent from the graph shown in FIG. 5, the comparison between averages (shown by solid bars) of wear amounts of the three materials shows that the wear amount of the wood ceramics is much smaller than that of the paper material and similar to that of the copper alloy.

Figure 6:
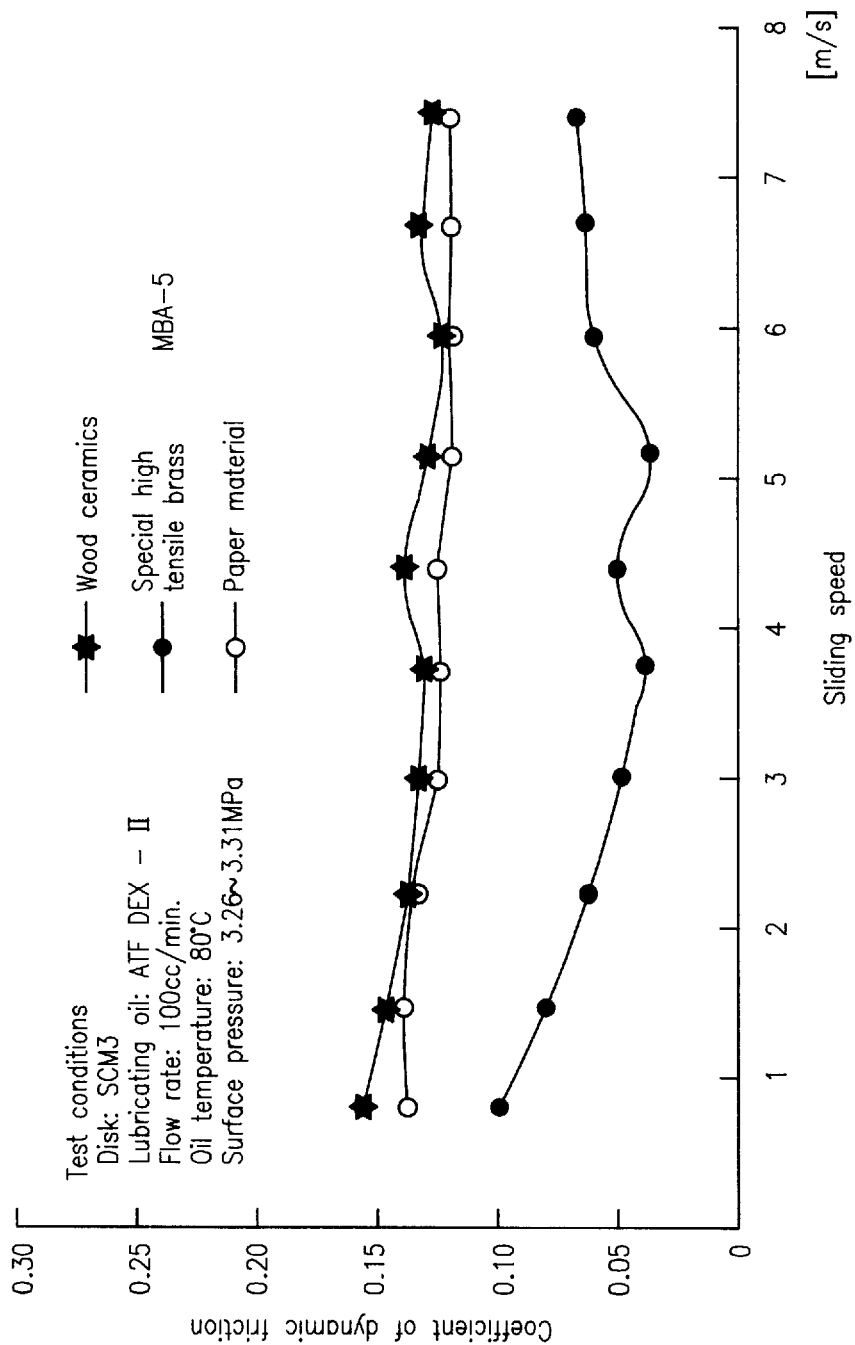
FIG. 6 is a graph showing coefficients of dynamic friction of wood ceramics, copper alloy, and a paper material.

FIG. 6 is a graph showing the relation between the coefficient of dynamic friction and the sliding speed of the wood ceramics, the copper alloy, and the paper material.

As apparent from the graph shown in FIG. 6, the coefficient of dynamic friction of the wood ceramics is much larger than that of the copper alloy and similar to that of the paper material.

Further, another test on mis-operation of a clutch shift lever was carried out under the conditions of a sliding speed of 8.9 m/s, a pressing pressure of 690 N, and a pressing time of 2 seconds, so as to examine the presence or absence of seizure and abnormal wear of the friction surface. As the test result, no seizure occurred on the wood ceramics and the copper alloy, whereas burning and wearing remarkably occurred on the paper material.

Accordingly, it was confirmed that the wood ceramics is hardly seized and has a large coefficient of dynamic friction, so that this material is excellent as the friction material for the synchronizer ring.

ADVANTAGES OF INVENTION

The synchronizer ring of the present invention can exhibit the following effects owing to the use of wood ceramics as the friction member.

(1) When the friction member is pressed on the opposite member, numerous pores of the wood ceramics function to suppress the formation of an oil film at a friction interface, thereby enlarging the coefficient of dynamic friction of the synchronizer ring. Accordingly, the synchronizer ring can quickly synchronize two gears.

(2) Since the coefficient of friction in a condition where a relative velocity between the synchronizer ring and the opposite member is near zero after finishing the synchronization is not large, a shock at the time a gear comes to mesh with a sleeve to finish speed changing can be reduced.

(3) Since the wood ceramics is formed by carbonizing a wood material impregnated with a phenol resin, the wear resistance, heat resistance, and seizure resistance of the synchronizer ring can be increased, and the weight and cost can also be reduced.

(4) Both the characteristic of quickly synchronizing two gears and the characteristic of no burning as unattained in the prior art can be attained in the present invention.

What is claimed is:

1. A synchronizer ring comprising a ring-like structure having a tapered inner circumferential surface and a layer of a friction member formed on said tapered inner circumferential surface of said ring-like structure, wherein said friction member is formed of wood ceramics.

2. A synchronizer ring according to claim 1, wherein said layer of said friction member comprises a ring-like layer.

3. A synchronizer ring according to claim 1, wherein said layer of said friction member comprises a plurality of chips.

4. A synchronizer ring according to claim 2, wherein said layer of said friction member comprises a layer formed by fixing a wood ceramics precursor to said structure and then carbonizing to bake said wood ceramics precursor.

5. A synchronizer ring according to claim 3, wherein said layer of said friction member comprises a layer formed by fixing a wood ceramics precursor to said structure and then carbonizing to bake said wood ceramics precursor.

6. A synchronizer ring according to claim 2, wherein said layer of said friction member comprises a layer formed by baking a wood ceramics-containing film on said structure to thereby integrate said film with said structure.

7. A synchronizer ring according to claim 3, wherein said layer of said friction member comprises a layer formed by baking a wood ceramics-containing film on said structure to thereby integrate said film with said structure.

* * * * *